United States Patent
Claesson et al.

(10) Patent No.: US 12,157,490 B2
(45) Date of Patent: Dec. 3, 2024

(54) METHOD FOR ELECTRICALLY DISCONNECTING TWO MODULES OF A VEHICLE, A CONTROL DEVICE, A VEHICLE, A SYSTEM, A COMPUTER PROGRAM AND A COMPUTER-READABLE MEDIUM

(71) Applicant: Scania CV AB, Södertälje (SE)

(72) Inventors: André Claesson, Tullinge (SE); Linus Ährlig, Västerhaninge (SE); Robert Sjödin, Nyköping (SE); Sami Teppola, Nykvarn (SE); Mikko Kallio, Hölö (SE); Tomas Skeppström, Södertälje (SE); Morgan Colling, Hölö (SE)

(73) Assignee: Scania CV AB, Södertälje (SE)

( * ) Notice: Subject to any disclaimer, the term of this patent is extended or adjusted under 35 U.S.C. 154(b) by 488 days.

(21) Appl. No.: 17/051,812

(22) PCT Filed: Apr. 26, 2019

(86) PCT No.: PCT/SE2019/050380
§ 371 (c)(1),
(2) Date: Oct. 30, 2020

(87) PCT Pub. No.: WO2019/231371
PCT Pub. Date: Dec. 5, 2019

(65) Prior Publication Data
US 2021/0101613 A1    Apr. 8, 2021

(30) Foreign Application Priority Data

May 28, 2018    (SE) .................................... 1850634-5

(51) Int. Cl.
*B60W 60/00*    (2020.01)
*B60P 3/42*    (2006.01)
(Continued)

(52) U.S. Cl.
CPC ........... *B60W 60/001* (2020.02); *B60P 3/423* (2013.01); *B60R 16/0231* (2013.01); *B62D 63/025* (2013.01)

(58) Field of Classification Search
CPC .. B60W 60/001; B60P 3/423; B60R 16/0231; B62D 63/025
See application file for complete search history.

(56) References Cited

U.S. PATENT DOCUMENTS

| 4,488,267 A | 12/1984 | Harrison |
|---|---|---|
| 6,059,058 A | 5/2000 | Dower |

(Continued)

FOREIGN PATENT DOCUMENTS

| CN | 105150820 A | 12/2015 |
|---|---|---|
| CN | 106828152 A | 6/2017 |

(Continued)

OTHER PUBLICATIONS

May 7, 2022—(CN) First Office Action—App. No. 2019800342616.
(Continued)

*Primary Examiner* — Khoi H Tran
*Assistant Examiner* — Tien Minh Le
(74) *Attorney, Agent, or Firm* — Banner & Witcoff, Ltd.

(57) ABSTRACT

A method is performed by a control device (100) of a first module (30, 40) of a vehicle (1), for electrically disconnecting the first module (30, 40) from a second module (30, 40) that is physically connected to the first module (30, 40), wherein the assembled vehicle (1) is configured to communicate with a control center (200). The method includes: identifying (s101) that the assembled vehicle (1) is ready to be disassembled; inactivating (s102) communication means (50) in the first module (30, 40) for establishing the electrical disconnection; and transmitting (s103) a verification of the electrical disconnection to the control center (200).

24 Claims, 5 Drawing Sheets

(51) Int. Cl.
*B60R 16/023* (2006.01)
*B62D 63/02* (2006.01)

(56) References Cited

U.S. PATENT DOCUMENTS

| | | | |
|---|---|---|---|
| 9,802,661 B1 | 10/2017 | Kentley-Klay | |
| 10,545,509 B1* | 1/2020 | Jessen | B62D 63/025 |
| 2004/0084920 A1* | 5/2004 | Trimble | B60R 11/02 |
| | | | 296/37.8 |
| 2011/0288700 A1* | 11/2011 | Pebbles | B60L 3/0046 |
| | | | 701/22 |
| 2016/0071418 A1* | 3/2016 | Oshida | G05D 1/0295 |
| | | | 701/23 |
| 2016/0129958 A1 | 5/2016 | Byrnes et al. | |
| 2017/0197678 A1 | 7/2017 | Scaringe | |
| 2017/0197679 A1 | 7/2017 | Scaringe et al. | |
| 2018/0039285 A1 | 2/2018 | Giegel | |
| 2018/0050626 A1* | 2/2018 | Delp | B60L 50/60 |
| 2018/0345971 A1* | 12/2018 | Birnschein | B60W 10/08 |

FOREIGN PATENT DOCUMENTS

| | | |
|---|---|---|
| DE | 10 2016 209 099 A1 | 7/2017 |
| DE | 10 2018 002 229 A1 | 8/2018 |
| DE | 10 2017 216 207 A1 | 10/2018 |
| EP | 2 927 105 B1 | 8/2017 |
| WO | 9911508 A1 | 3/1999 |
| WO | 2010071539 A1 | 6/2010 |
| WO | WO 2014/007729 A1 | 1/2014 |
| WO | WO 2018/222375 A1 | 12/2018 |

OTHER PUBLICATIONS

Novelty Search Report dated Feb. 1, 2018.
Office Action mailed Oct. 30, 2018 in corresponding Swedish Patent Application No. 1850634-5.
International Search Report mailed Jul. 1, 2019 in corresponding PCT International Application No. PCT/SE2019/050380.
Written Opinion mailed Jul. 1, 2019 in corresponding PCT International Application No. PCT/SE2019/050380.
Feb. 10, 2022—(EP) Extended Search Report—U.S. Appl. No. 19/811,254.

* cited by examiner

METHOD FOR ELECTRICALLY DISCONNECTING TWO MODULES OF A VEHICLE, A CONTROL DEVICE, A VEHICLE, A SYSTEM, A COMPUTER PROGRAM AND A COMPUTER-READABLE MEDIUM

CROSS-REFERENCE TO RELATED APPLICATIONS

The present application is a 35 U.S.C. §§ 371 national phase conversion of PCT/SE2019/050380, filed Apr. 26, 2019, the contents of which are incorporated herein by reference, which claims priority of Swedish Patent Application No. 1850634-5, filed May 28, 2018, the contents of which are incorporated by reference herein. The PCT International Application was published in the English language.

TECHNICAL FIELD

The present invention relates to a method for electrically disconnecting two physically connected modules of a vehicle.

BACKGROUND

Vehicles of today are typically manufactured for a specific purpose, e.g. a bus is manufactured for transporting people and a truck is manufactured for transporting goods, Such vehicles are typically manufactured and completely assembled in a factory or they may be partly assembled in a factory and completed at a body manufacturer. Once the vehicle is assembled, the vehicle will only be used for the specific purpose. Thus, a bus will only be used as a bus and a garbage truck will only be used as a garbage truck. Different vehicles are thus needed for different purposes, which may require a large fleet of vehicles and which may be very costly. A more flexible vehicle which enables customization may therefore be desired.

There are, for example, known solutions where a truck can be rebuilt by changing a concrete mixer to a loading platform. This increases the flexibility and two different functions can be achieved by means of one single vehicle. Depending on the modules, it may be desired to enable communication between the modules. The modules may thereby have to be electrically connected when being part of a vehicle. When the vehicle is being disassembled, the modules have to be electrically disconnected. It is important that such electrical disconnection is performed in a safe way, such that disconnection is not performed by mistake. Document US-2016/0129958 A discloses a modular electric vehicle using interchangeable vehicle assembly modules. The user can thereby disassemble and reassemble the vehicle for use in different applications. The modules are all connected to a central bus and a central network bus when being part of the vehicle.

SUMMARY

Despite known solutions in the field, it would be desirable to achieve a way of electrically disconnecting physically connected modules of a vehicle, which is safer, easier and less time consuming.

An object of the present invention is therefore to achieve a new and advantageous method for electrically disconnecting two physically connected modules of a vehicle, which method is safer, easier and less time consuming than prior art solutions. Another object of the invention is to achieve a new and advantageous control device, vehicle, system, computer program and computer-readable medium for electrically disconnecting two physically connected modules of a vehicle in a safer, easier and less time consuming way.

The herein mentioned objects are achieved by a method for electrically disconnecting two modules of a vehicle, a control device, a vehicle, a system, a computer program and a computer-readable medium according to the independent claims.

Hence, according to an aspect of the present invention, a method, performed by a control device of a first module of a vehicle, for electrically disconnecting the first module from a second module physically connected to the first module is provided. The vehicle is assembled from a set of modules comprising: at least one drive module; and at least one functional module, wherein the at least one drive module comprises a pair of wheels and is configured to be autonomously operated and drive the assembled vehicle, and wherein the assembled vehicle is configured to communicate with a control center, the method comprising: identifying that the assembled vehicle is ready to be disassembled; inactivating communication means in the first module for establishing the electrical disconnection; and transmitting a verification of the electrical disconnection to the control center.

According to another aspect of the invention, a control device of a first module of a vehicle is provided. The control device is configured for electrically disconnecting the first module from a second module physically connected to the first module. The vehicle is assembled from a set of modules comprising: at least one drive module; and at least one functional module, wherein the at least one drive module comprises a pair of wheels and is configured to be autonomously operated and drive the assembled vehicle, and wherein the assembled vehicle is configured to communicate with a control center. The control device is configured to: identify that the assembled vehicle is ready to be disassembled; inactivate communication means in the first module for establishing the electrical disconnection; and transmit a verification of the electrical disconnection to the control center.

A vehicle assembled from a set of modules makes it possible to dynamically achieve different vehicles depending on a current mission or function to be performed. Thus, from the same set of modules, for example a truck, a garbage truck, a bus or a snowplough can be assembled. Not only will this result in increased flexibility, but the cost for a vehicle owner will decrease significantly, compared to having a plurality of different vehicles for different applications. By using at least one autonomously operated drive module, the drive module may autonomously/automatically perform the physical and electrical connection with a second module. In this way, no manual work is required and the assembly of the vehicle is less cumbersome and much more time efficient. When a mission or function has been performed by the vehicle, the vehicle may be disassembled. This means that the different modules should be both electrically and physically disconnected from each other. By means of the disclosed method, the electrical disconnection between two physically connected modules can be performed in a safe and efficient way. By first identifying that the vehicle is ready to be disassembled, it is ensured that no electrical disconnection will be performed by mistake, for example during operation of the vehicle. The electrical disconnection is established by means of inactivating communication means in the modules. The electrical disconnection is subsequently verified to the control center. By the verification of the electrical disconnection, the control center will be informed that the modules are ready to be physically disconnected. The verification also enables the control center to detect if an incorrect electrical disconnection has been performed. Thus, by means of the verification it is ensured that correct modules are disconnected and that they are electrically disconnected in a correct way. Safety is thereby increased.

When disassembling a modularized vehicle, it may be desired to electrically disconnect the modules before they are physically disconnected. To be able to ensure safety, a method for electrically disconnecting two physically connected modules of a vehicle has been developed. A modularized vehicle according to the present disclosure is typically disassembled, and the modules are electrically disconnected, at the vehicle owner's premises. The vehicle owner typically buys a set of modules comprising a plurality of different modules to form different types of vehicles from a manufacturer and the assembly and disassembly is performed by the vehicle owner. The present disclosure is applicable on all sorts of road vehicles. However, the disclosure may relate to heavy vehicles, such as buses, trucks etc. Specifically, the present disclosure may relate to vehicles for use on public roads.

Typically, a vehicle operator, such as a fleet manager or vehicle owner, has a list of requested functions/missions to be performed. Such functions/missions could be transporting persons, goods, garbage or similar. In order to perform a certain function/mission, the operator requires a specific vehicle and the operator typically plans which vehicle to use, when, and for which mission. According to an example of the present disclosure, a control center receives information about at least one requested function/mission to be performed. Such a control center may also be referred to as an off-board system and may be configured for fleet management, vehicle assembly/disassembly or similar. The control center is thus arranged geographically at a distance from the modules and the assembled vehicle(s). In one example, the control center receives the information about the at least one function/mission to be performed from an operator via a user interface, such as a touch screen, keyboard or similar. In another example, the information regarding the function/mission is automatically obtained by the control center by means of for example Artificial Intelligence, based on requested functions/missions to be performed. When the control center has information about a function/mission to be performed, the control center may determine what type of vehicle is required to perform said function/mission. The control center may select modules to form the assembled vehicle based on a function to be performed by the assembled vehicle. The control center then transmits signals to the modules with the command of connecting physically with each other. The control center may also transmit instructions to the modules to connect electrically with each other. When the assembled vehicle has performed the mission/function, the vehicle operator may determine to disassemble the vehicle, for example in order to reuse one or more of the modules to assemble another type of vehicle.

According to an aspect of the present disclosure, a method performed by a control device of a first module of a vehicle, for electrically disconnecting the first module from a second module physically connected to the first module is provided. The vehicle being assembled from a set of modules comprises: at least one drive module; and at least one functional module, wherein the at least one drive module comprises a pair of wheels and is configured to be autonomously operated and drive the assembled vehicle, and wherein the assembled vehicle is configured to communicate with a control center. The method comprises: identifying that the assembled vehicle is ready to be disassembled; inactivating communication means in the first module for establishing the electrical disconnection; and transmitting a verification of the electrical disconnection to the control center. The control device of the first module is thus configured to communicate with the control center. The electrical disconnection of the modules is performed by means of the control device of the first module. Since the electrical disconnection of the modules is autonomously performed, no human will be involved to make sure that everything is done correctly. Thus, by identifying that the vehicle is ready to be disassembled before electrically disconnecting the modules, it is ensured that no inappropriate disconnection is performed. Inactivating the communication means in the first module means that communication with the second module is disabled and the electrical disconnection is thereby established. The electrical disconnection is thereafter verified to the control center and the first module is thereby ready to be physically disconnected from the second module. Suitably, both modules transmit a verification of the electrical disconnection to the control center by means of their respective control device. In this way, the control center is informed that the electrical disconnection has been correctly performed and also that the correct modules were electrically disconnected.

The set of modules from which the vehicle is assembled may comprise a plurality of drive modules and a plurality of functional modules. The first module may thus be a drive module or a functional module and the second module may be a drive module or a functional module. The different drive modules of the set of modules may be identical or the drive modules may for example have different types/sizes of wheels, different suspension, different power capacity and/or different charge capacity. In one example each drive module comprises a body provided with a pair of wheels arranged on two opposite sides of the drive module. In an example, the drive module comprises only one pair of wheels. The drive module comprises at least one propulsion unit connected to the pair of wheels. The propulsion unit may be an electric machine, connected to the wheels. The pair of wheels of the drive module may thus be referred to as drive wheels. In one example, the drive module comprises two electrical machines, one connected to each wheel. The electric machines may be arranged in the rim of the wheels. The wheels of the drive module can thus be driven independently of each other. The electric machines may also work as generators and generate electric power when braking the wheels. The drive module may also comprise a steering system connected to the wheels. This way, the drive module is steerable. The drive module may also comprise a brake system for braking the wheels. Suitably, the brake system comprises a wheel brake for each wheel of the drive module. Redundancy is achieved in that the drive module can be steered by means of the electrical machines and/or the wheel brakes in the event that the steering system malfunctions. In one example, the drive module further comprises at least one energy storage unit for providing the propulsion unit with energy. The energy storage unit may be an electric battery. The electric battery may be rechargeable. The drive module is configured to be autonomously operated means so that the drive module comprises a plurality of sensors and systems for steering and driving the drive module automatically as an independent unit according to conventional methods. According to an example, the drive module comprises a navigation system and sensors for detecting objects in the surroundings of the drive module. The drive module may be referred to as an autonomously operated vehicle in the sense that it is allowed to operate on public roads.

Each functional module is configured to perform a predetermined function while being part of an assembled vehicle. In one example, the functional module is configured to accommodate or support a load. The functional module may be configured for accommodating passengers and may thus function as a bus when being assembled with at least one drive module. The functional module may alternatively be configured for transporting goods and may thus function as a truck when being assembled with at least one drive module. The functional module may be any of a garbage truck body, a loading platform, a fork arrangement for a forklift, and a snowplough just to mention a few illustrative and non-limiting examples. The functional module may comprise trailing wheels which are not driven or steerable. A functional module cannot move on its own but needs to be connected to at least one drive module to be able to move, wherein the functional module and the drive module together form a vehicle. The functional module may comprise an energy storage unit, such as a battery.

According to one example, the first module and the second module both comprise a control device as disclosed herein, wherein the method is performed in both modules.

The first module and the second module may be physically connected through corresponding physical interfaces. Such physical interfaces may be configured in different ways, and may for example comprise coupling units adapted to engage, quick couplings, hooks, cooperating protrusions and recesses or similar. It is to be understood that the configuration of the physical interface is not part of the invention per se. The first module may comprise a physical interface for connection with another module on at least two different sides of the first module. In this way, the first module can be connected to another module in various ways and the flexibility is increased. The different physical interfaces for connection with another module may be identical on all sides of the first module.

In the event that the first module is a drive module, the first module may comprise a physical interface both on a front side of the first module and on a rear side of the first module. The first module, in this example being a drive module, can thereby be connected to a front section of a functional module and to a rear section of a functional module, without having to turn the first module. Additionally or alternatively, the first module being a drive module may comprise a physical interface on a top side of the first module. By using a standard interface which can be used for connection with another drive module as well as a functional module, the flexibility of the first module increases and the assembly of a vehicle is facilitated. The physical connection may be autonomously performed when the first module and/or the second module is an autonomously operated drive module.

According to an example, the step of inactivating communication means in the first module comprises inactivating an internal communication network in the first module. The communication means in the first module comprises means for transferring electric energy and/or transmitting/receiving electric signals to/from another module, such as the second module. Thus, the communication means may comprise an internal communication network. The internal communication network may be CAN J1939, Flexray, Ethernet, fibre or similar. The first module and the second module are suitably electrically connected via corresponding electrical interfaces comprising the communication means. Such an electrical interface may thus be configured to transfer electric energy and/or to transmit and/or receive electric signals. The electrical interface may be a wireless interface and/or a conductive interface and the communication means may thereby be wireless and/or conductive. By connecting the first module and the second module electrically, the modules may thus be able to transfer electric energy between each other and also share information. The communication means may comprise a transmitter and/or a receiver for wireless communication. The communication means may be inactivated by means of controlling a switch, a contactor or similar. In addition to the communication means for communicating with another module, the first module also comprises wireless communication means for communicating with the control center. The communication means for communicating with the control center may always be activated.

Identifying that the assembled vehicle is ready to be disassembled may comprise receiving instructions from the control center to disassemble the vehicle. The control center may transmit such instructions to all modules of the vehicle or only to a module operating as a master. In the event that the first module is a drive module operating as a master, the control device of the first module may, based on such instructions, control the first module, and thus the assembled vehicle, to a predetermined location for disassembly. This way, it is ensured that the vehicle is not disassembled in the middle of a road or on another inconvenient location. The predetermined location may be received from the control center together with the instruction to disassemble, or the predetermined location may be stored in the control device. The predetermined location may thus always be the same location, or it may vary depending on where the vehicle is operating. Identifying that the assembled vehicle is ready to be disassembled may additionally or alternatively comprise identifying that the vehicle is at such predetermined location for disassembly of the vehicle. The predetermined location is a location suitable for disassembly of the vehicle. The predetermined location may thus be the vehicle owner's premises, a garage, a service station or similar. Irrespective of whether the first module is operated as master or as a slave, identifying that the assembled vehicle is ready to be disassembled comprises identifying that the vehicle is at a predetermined location for disassembly of the vehicle. Since the electrical disconnection is performed without human interaction, it is important that the control device of the first module ensures that the disconnection is performed on a suitable location. That the vehicle is at the predetermined location may be identified by means of sensor devices and/or navigation systems arranged in communication with the control device. When the control device of the first module has identified that the vehicle is ready to be disassembled, the electrical disconnection may be performed.

It is pointed out, that the electrical and also the physical disconnection may take place at a roadside, e.g. due to a malfunction of a drive module of the assembled vehicle. In such a case, a replacement drive module may itself autonomously drive to the geographical position of the assembled vehicle in order to replace the malfunctional drive module. In such a scenario, the control center may order electrical disconnection of the malfunctioning drive module and the rest of the assembled vehicle without the assembled vehicle having to drive to a predetermined location. In this example, the first module may be the malfunctioning drive module or e.g. a functional module of the assembled vehicle.

The method may further comprise receiving a command from the control center to electrically disconnect the first module from the second module. As a response to such command, the control device may inactivate the communication means in the first module and thereby establish the electrical disconnection. Thus, the control device of the first module may inactivate the communication means based on the vehicle being ready to be disassembled as previously described, or it may inactivate the communication means further based on a received command to electrically disconnect the first module from the second module. This step may be performed irrespective of whether the first module is operated as a master or as a slave. However, if the first module is configured to operate as a master and the second module is configured to operate as a slave, the method may further comprise commanding the second module to inactivate communication means in the second module. According to an example, the control center only transmits an instruction to disassemble the vehicle and/or to electrically disconnect the first module from the second module to the module operating as a master. Thus, if the first module is operating as a master, the second module will not receive this instruction from the control center. Therefore, the first module may command the second module to inactivate communication means in the second module, such that the second module is electrically disconnected from the first module. It is to be understood that electrical disconnection is established once either of the first and second modules inactivates its communication means, but it may be desired to ensure that the communication means of both modules are inactivated. If the first module is operating as a slave, the method may further comprise receiving a command from a module operating as a master, to inactivate the communication means of the first module. If the second module is operating as a master, the first module may thus receive a command from the second module to inactivate the communication means of the first module.

The module operating as a master will decide how to operate the modules operating as slaves. Typically a drive module of the vehicle is appointed to operate as a master, and any other drive modules and the functional module will thereby be operated as slaves. The master drive module will thereby decide how to operate the slave drive module(s) and the functional module and thus how to operate the assembled vehicle. The control center may appoint which module to operate as a master and which to operate as slave(s) when assembling the vehicle. The control center may appoint the module to operate as master for example based on the state of charge of the energy storage units of the modules and/or the main travel direction of the assembled vehicle. According to another example, the assembled vehicle itself determines which module to operate as a master and which module(s) to operate as slave(s).

According to an example, the method further comprises saving operational data of the first module. The operational data is saved and stored in the control device. The method may further comprise transmitting operational data of the first module to the control center. The operational data may comprise a state of charge (SOC) of an energy storage unit of the first module. The operational data may additionally or alternatively comprise error codes activated during operation of the first module, the total travelled distance, the travelled distance during the latest mission, maximum/minimum temperature in the module during the latest mission, maximum acceleration/retardation/vibration during the latest mission, detected communication problems with other modules or information about the status of the energy storage unit. The transmitted operational data of the first module may be used by the control center when a new vehicle is about to be assembled.

According to an example, the method further comprises deleting the relationship between a unique vehicle identity of the assembled vehicle and the first module; and setting the first module in a waiting mode. The control center typically generates a unique identity when a vehicle is assembled and transmits the unique vehicle identity to all modules of the assembled vehicle or at least to a master module for forwarding to the rest of the modules of the vehicle. The unique vehicle identity may be a number, a combination of letters and/or numbers, or a specific word. No matter if a module is exchanged due to malfunction, the unique vehicle identity remains the same. The unique vehicle identity thus remains the same until the vehicle is disassembled. The unique vehicle identity is used in the communication between the control center and the different modules. When the vehicle is disassembled and the modules are electrically disconnected, the modules should no longer be associated with a unique vehicle identity. Thus, by deleting the relationship between the unique vehicle identity and the first module, the first module becomes an electrically separate module with no connection to the assembled vehicle more than being physically connected to the second module. The first module is also set into a waiting mode, such that the control center knows that the first module is ready to be physically disconnected and also free to be used in a new vehicle.

The present disclosure also relates to a control device of a first module of a vehicle, the control device being configured for electrically disconnecting the first module from a second module physically connected to the first module, the vehicle being assembled from a set of modules comprising: at least one drive module; and at least one functional module, wherein the at least one drive module comprises a pair of wheels and is configured to be autonomously operated and drive the assembled vehicle, and wherein the assembled vehicle is configured to communicate with a control center. The control device is configured to: identify that the assembled vehicle is ready to be disassembled; inactivate communication means in the first module for establishing the electrical disconnection; and transmit a verification of the electrical disconnection to the control center.

It will be appreciated that all the embodiments described for the method aspect of the invention performed by the control device are also applicable to the control device aspect of the invention. That is, the control device may be configured to perform any one of the steps of the method according to the various embodiments described above.

The first module comprises the control device and the control device may be configured to control the operation of the first module. In the event that the first module is a drive module, the control device may thus be configured to transmit control signals to the various systems and components of the first module for controlling for example the steering and the propulsion of the first module. The control device may thereby be adapted to operate the first module autonomously based on received commands, e.g. from the control center, and based on sensor input regarding its surroundings and positioning. The control device is in that case adapted to receive commands from a remotely located control center and to convert the command into control signals for controlling the various systems and components of the first module. The control device may be configured to receive data about the surroundings from various sensor devices, and based on this data control the first module. The control device may also be adapted to communicate with traffic systems of various kinds. The control device may thereby be able to determine the status of a traffic light, determine if an accident has occurred and based on that determine a new route for the vehicle, or itself if not connected to a functional module, etc. The control device may be adapted to communicate directly with such traffic systems or it may be adapted to communicate with such traffic systems via the control center. The control device may be implemented as a separate entity or distributed in two or more physical entities. The control device may comprise one or more computers. The control device may thus be implemented or realized by the control device comprising a processor and a memory, the memory comprising instructions, which when executed by the processor causes the control device to perform the herein disclosed method steps.

The present disclosure also relates to a computer program comprising instructions which, when the program is executed by a computer, causes the computer to carry out the method disclosed above. The invention further relates to a non-volatile computer-readable medium comprising instructions, which when executed by a computer causes the computer to carry out the method disclosed above.

Furthermore, the present disclosure relates to a system configured to electrically disconnect physically connected modules of a vehicle, the system comprising a control center arranged in communication with the vehicle, wherein the system further comprises at least one control device as disclosed herein. Thus, the system is configured to electrically disconnect a first module of a vehicle from a second module of a vehicle, the first and second modules being physically connected. The vehicle is assembled from a set of modules comprising: at least one drive module; and at least one functional module, wherein the at least one drive module comprises a pair of wheels and is configured to be autonomously operated and drive the assembled vehicle. The control center being arranged in communication with the assembled vehicle means that the control center is arranged in communication with at least one module of the assembled vehicle. Thus, the control center is arranged in communication with at least one control device of a module of the vehicle. The control center and the control device as disclosed herein are arranged in communication.

According to an example, the vehicle comprises a drive module and a functional module, wherein each module comprises a control device as disclosed herein. The system may then comprise the control center and the two control devices. Each control device is comprised in one of the physically connected modules, wherein for each control device, the module in which it is comprised is the first module. Thus each control device of the system is configured to: identify that the assembled vehicle is ready to be disassembled; inactivate communication means in the first module for establishing the electrical disconnection; and transmit a verification of the electrical disconnection to the control center.

The control center may be referred to as an off-board system. The control center may be geographically on a distance from the modules. The control center may be adapted to receive information about missions or functions to be performed and based on this mission/function initiate assembly of a vehicle. The control center may also be configured to initiate disassembly of the vehicle. The control center may be implemented as a separate entity or distributed in two or more physical entities. The control center may comprise one or more computers.

According to an aspect of the present disclosure, a vehicle assembled from a set of modules is provided. The set of modules comprises: at least one drive module; and at least one functional module, wherein the at least one drive module comprises a pair of wheels and is configured to be autonomously operated and drive the assembled vehicle. The vehicle further comprises a control device as disclosed herein. The vehicle thus comprises a first module and a second module, physically connected to the first module.

Further objects, advantages and novel features of the present invention will become apparent to one skilled in the art from the following details, and also by putting the invention into practice. Whereas embodiments of the invention are described below, it should be noted that it is not restricted to the specific details described. Specialists having access to the teachings herein will recognize further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION

The present disclosure will now be further illustrated with reference to the appended Figures.

The term "link" refers herein to a communication link which may be a physical connection such as an opto-electronic communication line, or a non-physical connection such as a wireless connection, e.g. a radio link or microwave link.

Figure 1:
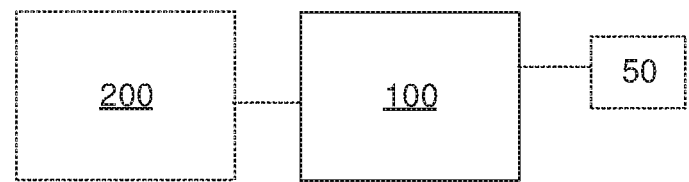
FIG. 1 schematically illustrates a control device of a first module of a vehicle according to an embodiment.

FIG. 1 schematically illustrates a control device 100 of a first module of a vehicle according to an embodiment. The control device 100 is configured for electrically disconnecting the first module from a second module physically connected to the first module. The vehicle is assembled from a set of modules comprising: at least one drive module; and at least one functional module. The first module may thus be a drive module or a functional module. If the first module is a drive module the second module may be a drive module or a functional module. If the first module is a functional module, the second module is suitably a drive module. The vehicle, the set of modules, the at least one drive module, the at least one functional modules and thus the first module and the second module are disclosed in FIG. 3. The first module and the second module are physically connected. The control device 100 is comprised in the first module. Thus, irrespective of whether the first module is a drive module or a functional module it comprises the control device 100 according to the present disclosure. The control device 100 of the first module is configured to communicate with a control center 200. The control device 100 may be configured to communicate with the control center 200 by means of wireless communication means.

The control device 100 is configured to: identify that the assembled vehicle is ready to be disassembled; inactivate communication means 50 in the first module for establishing the electrical disconnection; and transmit a verification of the electrical disconnection to the control center 200. The control device 100 is arranged in communication with the communication means 50. The control device 100 is configured to control the communication means 50 of the first module.

The control device 100 may also be configured to inactivate an internal communication network in the first module. The communication means 50 in the first module is means for transferring electric energy and/or transmitting/receiving electric signals to/from another module, such as the second module. Thus, the communication means 50 may comprise an internal communication network. The internal communication network may be CAN J1939, Flexray, Ethernet, fiber or similar. The communication means 50 may be wireless and/or conductive. The communication means 50 may comprise a transmitter and/or a receiver for wireless communication. The control device 100 may be configured to inactivate the communication means 50 by means of controlling a switch, a contactor or similar.

The control device 100 may be configured to identify that the assembled vehicle 1 is ready to be disassembled by receiving instructions from the control center 200 to disassemble the vehicle 1. The control center 200 may transmit instructions to all modules of the vehicle 1 to disassemble the vehicle 1. This way, all modules are aware that the vehicle 1 should be disassembled. Alternatively, the control center 200 only transmits instructions to disassemble the vehicle 1 to the module operated as a master. Thus, the first module may receive instructions to disassemble the vehicle 1 only if it is operated as a master.

The control device 100 may also be configured to identify that the assembled vehicle 1 is ready to be disassembled by identifying that the vehicle 1 is at a predetermined location for disassembly of the vehicle 1. If the control device 100 realizes that the vehicle 1, for example, is operated on a highway, the control device 100 may not inactivate the communication means 50 even if instructions to disassemble the vehicle 1 has been received. This way, the control device 100 will ensure that no electrical disconnection is performed in an inappropriate location. If the control device 100 has received instruction from the control device 200 to disassemble the vehicle 1, the control device 100 may be configured to control the first module such that the vehicle 1 is moved to a predetermined location for disassembly of the vehicle 1. The predetermined location may be received from the control center 200 together with the instruction to disassemble, or it may be stored in the control device 100. The predetermined location may thus always be the same location, or it may vary depending on where the vehicle 1 is.

The control device 100 may further be configured to receive a command from the control center 200 to electrically disconnect the first module from the second module. For example, the control device 100 may be configured to first receive instructions from the control center 200 to disassemble the vehicle 1, then when the vehicle 1 is at the predetermined location for disassembly, the control device 100 may be configured to receive a command from the control center 200 to electrically disconnect the first module from the second module. Alternatively, the first module does not receive instructions from the control center 200 to disassemble the vehicle 1, but may be configured to receive a command from the control center 200 to electrically disconnect the first module from the second module. In this case, the control device 100 may be configured to identify whether the vehicle 1 is at a predetermined location for disassembly of the vehicle 1 before performing the disconnection.

According to an example, the first module is configured to operate as a master and the second module is configured to operate as a slave, wherein the control device 100 is configured to command the second module to electrically disconnect from the first module. In another example, the first module is configured to operate as a slave, wherein the control device 100 is configured to receive a command from a module operating as a master, to inactivate communication means in the first module. This is typically the case when the control center 200 only transmits instructions to disassemble the vehicle 1 to the module operated as master.

The control device 100 is also configured to save operational data of the first module. The control device 100 may be configured to save operational data of the first module after having inactivated the communication means of the first module, but before transmitting the verification to the control center 200. The control device 100 may also be configured to transmit the operational data of the first module to the control center 200.

Furthermore, the control device 100 may be configured to delete the relationship between a unique vehicle identity of the assembled vehicle 1 and the first module and to set the first module in a waiting mode. The control device 100 is this way informing the control center 200 that the first module is ready to be used in another vehicle 1.

The control device 100 may be implemented as a separate entity or distributed in two or more physical entities. The control device 100 may comprise one or more computers. The control device 100 may thus be implemented or realized by the control device 100 comprising a processor and a memory, wherein the memory comprises instructions, which when executed by the processor, causes the control device to perform the method as disclosed in FIGS. 4*a-c*.

Figure 2:
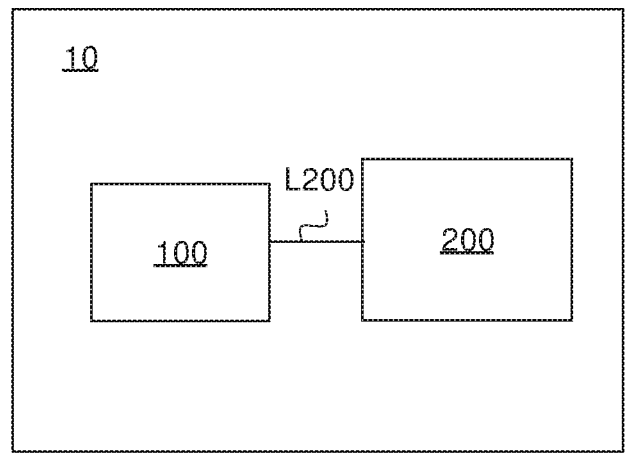
FIG. 2 schematically illustrates a system for electrically disconnecting two modules of a vehicle according to an embodiment.

FIG. 2 schematically illustrates a system 10 configured to electrically disconnect physically connected modules of a vehicle 1 according to an embodiment. The system 10 comprises a control center 200 arranged in communication with the vehicle 1 and at least one control device 100 as disclosed in FIG. 1.

The control device 100 is arranged in communication with the control center 200 via a link L200. The control center 200 may be referred to as an off-board system. The control center 200 may be implemented as a separate entity or distributed in two or more physical entities. The control center 200 may comprise one or more computers.

Figure 3:
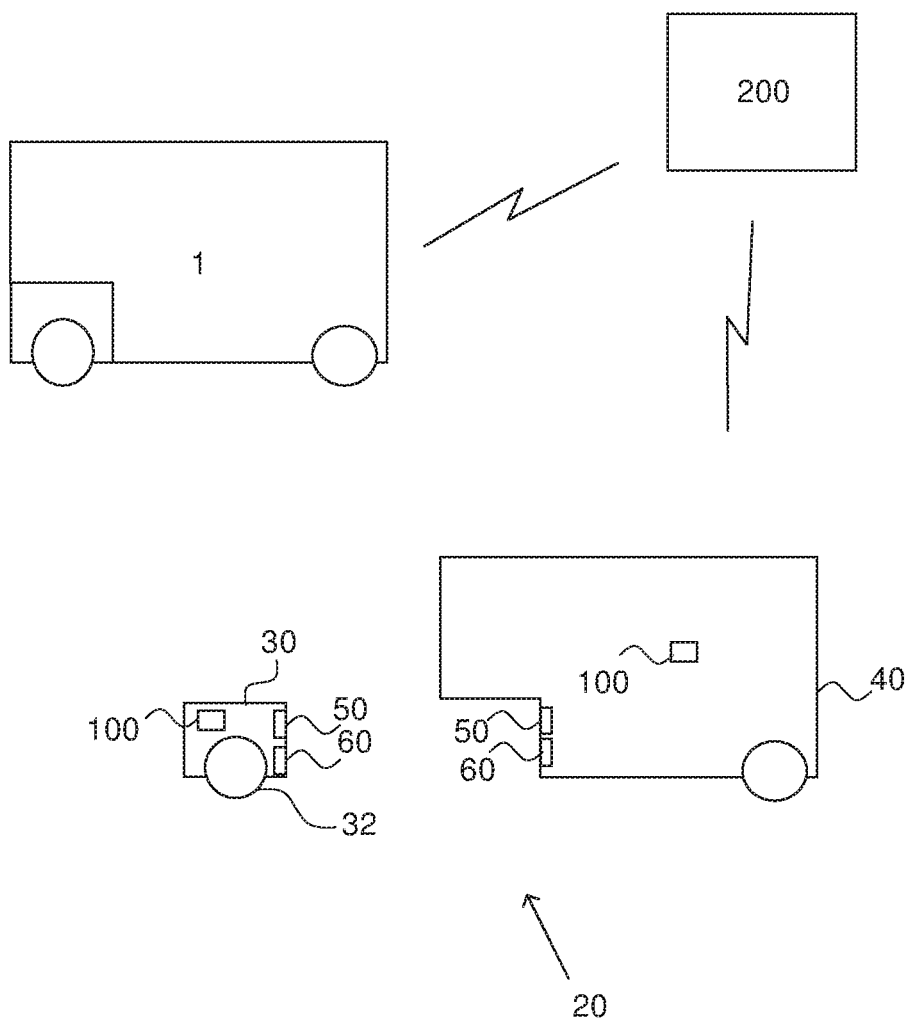
FIG. 3 schematically illustrates application of a system for electrically disconnecting two modules of a vehicle according to an embodiment.

FIG. 3 schematically shows an example of an application of a system 10 as disclosed in FIG. 2. Thus, FIG. 3 illustrates a context in which the system 10 may be used. The Figure illustrates an assembled vehicle 1, arranged in communication with a control center 200. The Figure also illustrates a drive module 30 and a functional module 40 after disassembly of the vehicle 1. The drive module 30 and the functional module 40 form part of a set of modules 20 for assembling a vehicle 1. The set of modules 20 typically comprises a plurality of drive modules 30 and a plurality of functional modules 40, wherein each drive module 30 comprises a pair of wheels 32 and is configured to be autonomously operated. Each module 30, 40 comprises at least one interface releasably connectable to a corresponding interface on another module 30, 40. The modules 30, 40 suitably comprise at least one physical interface and at least one electrical interface. By combining drive modules 30 and functional modules 40, different types of vehicles 1 can be achieved. In this Figure, the assembled vehicle 1 comprises one drive module 30 and one functional module 40. It is, however, to be understood that the vehicle 1 may comprise a plurality of drive modules 30. Some vehicles 1 require two drive modules 30 and some vehicles 1 only require one drive module 30, depending on the structural configuration of the functional module 40. In this example, the functional module 40 comprises wheels which are not driven but, the functional module 40 might just as well be configured without any wheels, whereby at least two drive modules 30 are required. Each module 30, 40 comprises a control device 100 as disclosed in FIG. 1 and can thus communicate with a control center 200 as also disclosed in FIG. 2, Each drive module 30 may comprise a plurality of interfaces for releasable connection with other modules 30, 40. The interface(s) of the drive modules 30 may be arranged on different sides of the drive module 30 and thus enable connection with other modules 30, 40 on multiple sides of the drive module 30. The interfaces on the drive modules 30 and the functional modules 40 respectively, are suitably arranged on corresponding positions to enable connection between the modules 30, 40. Each module 30, 40 comprises communication means 50 for communication with another module 30, 40. The communication means 50 may be comprised in the electrical interface of each module 30, 40. The communication means 50 of each module 30, 40 are controlled by the control devices 100 of the module 30, 40. The communication means 50 may comprise an internal communication network, such as CAN J1939, Flexray, Ethernet, fiber or similar. The communication means 50 may additionally or alternatively comprise a transmitter and a receiver for wireless communication between the modules 30, 40. The communication means 50 may be activated and inactivated by means of controlling a switch, a contactor or similar. Disassembly of the vehicle 1 may be initiated by the control center 200 and is typically performed according to the method configured in FIGS. 4a, 4b and 4c.

Figure 4A:
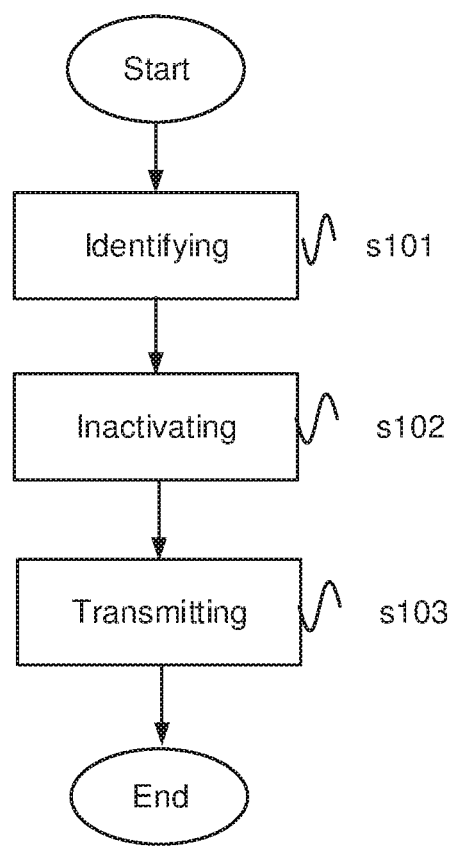
FIG. 4a-c illustrates flow charts for a method, performed by a control device, for electrically disconnecting two modules of a vehicle according to an embodiment.

FIG. 4a illustrates a flow chart for a method, performed by a control device of a first module of a vehicle, for electrically disconnecting the first module from a second module physically connected to the first module, according to an embodiment. The vehicle is assembled from a set of modules. The method thus relates to the control device 100 as disclosed in FIG. 1, the system 10 as disclosed in FIG. 2 and the set of modules 20 as disclosed in FIG. 3. The set of modules 20 thus comprises at least one drive module 30 and at least one functional module 40. The method comprises: identifying s101 that the assembled vehicle 1 is ready to be disassembled; inactivating s102 communication means 50 in the first module 30, 40 for establishing the electrical disconnection; and transmitting s103 a verification of the electrical disconnection to the control center 200. By identifying that the vehicle 1 is ready to be disassembled before electrically disconnecting the modules 30, 40, it is ensured that no inappropriate disconnection is performed. By the verification, the control center 200 is informed that the electrical disconnection has been correctly performed and also that the correct modules 30, 40 were electrically disconnected.

The first module 30, 40 may be a drive module 30 or a functional module 40 and the second module 30, 40 may be a drive module 30 or a functional module 40. The first module 30, 40 may be operated as a slave or as a master.

Inactivating s102 communication means 50 in the first module 30, 40 may comprise inactivating s102, an internal communication network in the first module 30, 40. The internal communication network may be CAN J1939, Flexray, Ethernet, fiber or similar. The communication means 50 may be wireless and/or conductive. The communication means 50 may comprise a transmitter and/or a receiver for wireless communication. The communication means may be inactivated s102 by means of controlling a switch, a contactor or similar.

Identifying s101 that the assembled vehicle 1 is ready to be disassembled may comprise receiving instructions from the control center 200 to disassemble the vehicle 1. Identifying s101 that the assembled vehicle 1 is ready to be disassembled may additionally or alternatively comprise identifying that the vehicle 1 is at a predetermined location for disassembly of the vehicle 1. The predetermined location is a location suitable for disassembly of the vehicle 1. That the vehicle 1 is at the predetermined location may be identified by means of sensor devices and/or navigation systems arranged in communication with the control device 100. When the control device 100 of the first module 30, 40 has identified that the vehicle 1 is ready to be disassembled, the electrical disconnection may be performed.

Figure 4B:
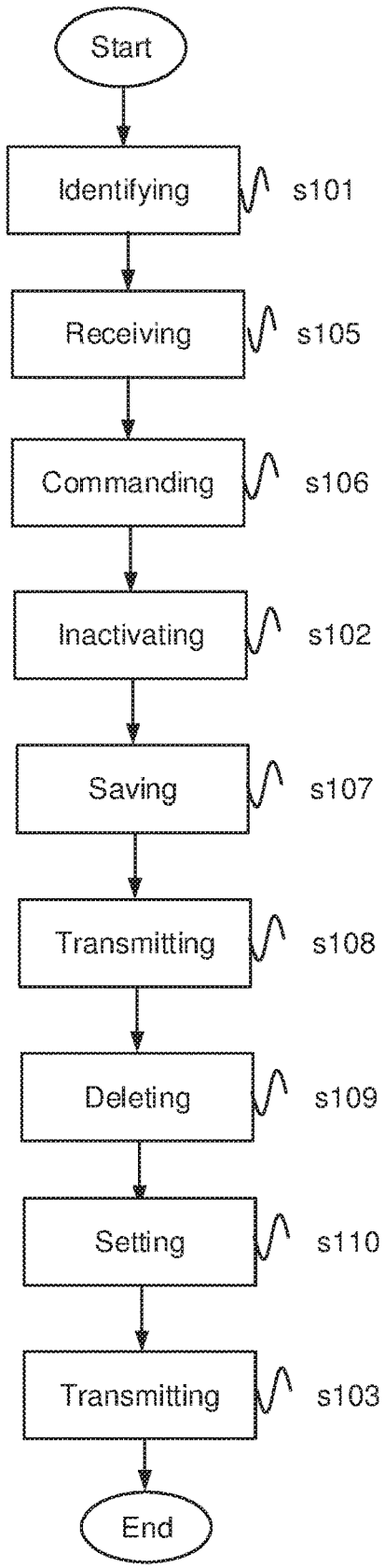

FIG. 4b illustrates a flow chart for a method, performed by a control device of a first module of a vehicle, for electrically disconnecting the first module from a second module physically connected to the first module, according to an embodiment. The vehicle is assembled from a set of modules. The method thus relates to the control device 100 as disclosed in FIG. 1, the system 10 as disclosed in FIG. 2 and the set of modules 20 as disclosed in FIG. 3. In this embodiment, the first module 30, 40 is operated as a master and the second module 30, 40 is operated as a slave.

The method comprises identifying s101 that the assembled vehicle 1 is ready to be disassembled. Identifying s101 that the assembled vehicle 1 is ready to be disassembled may comprise receiving instructions from the control center 200 to disassemble the vehicle 1. Identifying s101 that the assembled vehicle 1 is ready to be disassembled may additionally or alternatively comprise identifying that the vehicle 1 is at a predetermined location for disassembly of the vehicle 1. The predetermined location is a location suitable for disassembly of the vehicle 1. That the vehicle 1 is at the predetermined location may be identified by means of sensor devices and/or navigation systems arranged in communication with the control device 100. The control device 100 of the first module 30, 40 may, based on the instruction to disassemble the vehicle 1, control the first module 30, 40 and thus the assembled vehicle 1 to a predetermined location for disassembly. This way, it is ensured that the vehicle 1 is not disassembled in the middle of a road or on another inconvenient location. The predetermined location may be received from the control center 200 together with the instruction to disassemble, or it may be stored in the control device 100.

According to this example the method further comprises receiving s105 a command from the control center 200 to electrically disconnect the first module 30, 40 from the second module 30, 40. The control device 100 may thus first receive instructions from the control center 200 to disassemble the vehicle 1, and subsequently, for example when the vehicle 1 is at a predetermined location, the control device 100 receives a command from the control center 200 to electrically disconnect the first module 30, 40 from the second module 30, 40.

The method also comprises inactivating s102 communication means 50 in the first module 30, 40 for establishing the electrical disconnection and commanding s106 the second module 30, 40 to inactivate communication means in the second module 30, 40. According to an example, the control center 200 only transmits an instruction to disassemble the vehicle 1 and to electrically disconnect the first module 30, 40 from the second module 30, 40 to the module operating as a master. Thus, in this case where the first module 30, 40 is operating as a master, the second module 30, 40 will not receive any instructions/commands from the control center 200. Therefore, when the control device 100 has received the command to electrically disconnect the modules 30, 40, the control device 100 of the first module 30, 40 commands the second module 30, 40 to inactivate communication means in the second module 30, 40. Essentially simultaneously, the control device 100 also inactivates the communication means 50 in the first module 30, 40.

According to this example, the method further comprises saving s107 operational data of the first module 30, 40. The operational data is saved/stored in the control device 100. The method further comprises transmitting s108 such operational data of the first module 30, 40 to the control center 200. The operational data may comprise a state of charge (SOC) of an energy storage unit of the first module 30, 40. The operational data may additionally or alternatively comprise error codes activated during operation of the module 30, 40, the total travelled distance, the travelled distance during the latest mission, maximum/minimum temperature in the module 30, 40 during the latest mission, maximum acceleration/retardation/vibration during the latest mission, detected communication problems with other modules 30, 40 or information about the status of the energy storage unit.

The method further comprises deleting s109 the relationship between a unique vehicle identity of the assembled vehicle 1 and the first module 30, 40; and setting s110 the first module 30, 40 in a waiting mode. The unique vehicle identity is typically generated when a vehicle is assembled and is transmitted to all modules 30, 40 of the assembled vehicle 1. The unique vehicle identity may be a number, a combination of letters and/or numbers, or a specific word. The unique vehicle identity is for example used in the communication between the control center 200 and the different modules 30, 40 of the vehicle 1. When the vehicle 1 is disassembled and the modules 30, 40 are electrically disconnected, the modules 30, 40 should no longer be associated with a unique vehicle identity. Thus, by deleting the relationship between the unique vehicle identity and the first module 30, 40 and by setting the first module 30, 40 in a waiting mode, the first module 30, 40 is a separate module with no electrical connection to a vehicle or any other modules and the first module 30, 40 is thereby free to be used in a new vehicle.

Finally, the method comprises transmitting s103 a verification of the electrical disconnection to the control center 200. By the verification, the control center 200 is informed that the electrical disconnection has been correctly performed and also that the correct modules 30, 40 were electrically disconnected.

Figure 4C:
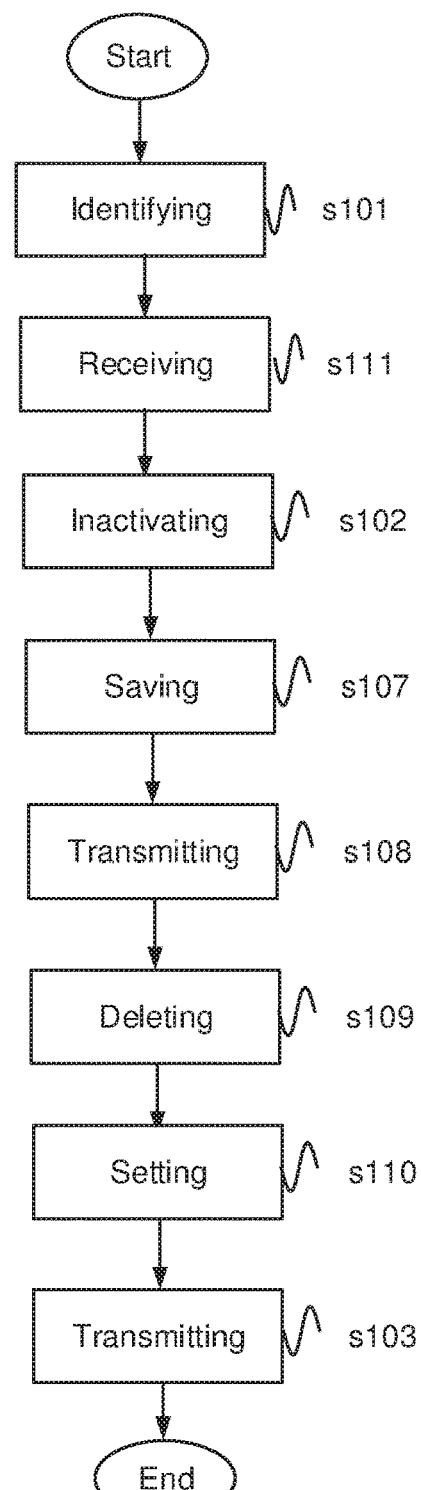

FIG. 4c illustrates a flow chart for a method, performed by a control device of a first module of a vehicle, for electrically disconnecting the first module from a second module physically connected to the first module, according to an embodiment. The vehicle is assembled from a set of modules. The method thus relates to the control device 100 as disclosed in FIG. 1, the system 10 as disclosed in FIG. 2 and the set of modules 20 as disclosed in FIG. 3. In this embodiment, the first module 30, 40 is operating as a slave.

The method comprises identifying s101 that the assembled vehicle 1 is ready to be disassembled. Identifying s101 that the assembled vehicle 1 is ready to be disassembled may comprise receiving instructions from the control center 200 to disassemble the vehicle 1. Identifying s101 that the assembled vehicle 1 is ready to be disassembled may additionally or alternatively comprise identifying that the vehicle 1 is at a predetermined location for disassembly of the vehicle 1. The predetermined location is a location suitable for disassembly of the vehicle 1. That the vehicle 1 is at the predetermined location may be identified by means of sensor devices and/or navigation systems arranged in communication with the control device 100. The predetermined location may be received from the control center 200 together with the instruction to disassemble, or it may be stored in the control device 100.

The method further comprises receiving s111 a command from a module 30, 40 operating as a master, to inactivate the communication means 50 of the first module 30, 40. If the second module 30, 40 is operating as a master, the first module 30, 40 may thus receive s111 a command from the second module 30, 40 to inactivate the communication means 50 of the first module 30, 40. The method also comprises inactivating s102 communication means 50 in the first module 30, 40 for establishing the electrical disconnection.

According to this example, the method further comprises saving s107 operational data of the first module 30, 40. The operational data is saved/stored in the control device 100. The method further comprises transmitting s108 such operational data of the first module 30, 40 to the control center 200. The operational data may comprise a state of charge (SOC) of an energy storage unit of the first module 30, 40. The operational data may additionally or alternatively comprise error codes activated during operation of the module 30, 40, the total travelled distance, the travelled distance during the latest mission, maximum/minimum temperature in the module 30, 40 during the latest mission, maximum acceleration/retardation/vibration during the latest mission, detected communication problems with other modules 30, 40 or information about the status of the energy storage unit.

The method further comprises deleting s109 the relationship between a unique vehicle identity of the assembled vehicle 1 and the first module 30, 40; and setting s110 the first module 30, 40 in a waiting mode. The unique vehicle identity is typically generated when a vehicle is assembled and is transmitted to all modules 30, 40 of the assembled vehicle 1. The unique vehicle identity may be a number, a combination of letters and/or numbers, or a specific word. The unique vehicle identity is for example used in the communication between the control center 200 and the different modules 30, 40 of the vehicle 1. When the vehicle 1 is disassembled and the modules 30, 40 are electrically disconnected, the modules 30, 40 should no longer be associated with a unique vehicle identity. Thus, by deleting the relationship between the unique vehicle identity and the first module 30, 40 and by setting the first module 30, 40 in a waiting mode, the first module 30, 40 is a separate module with no connection to a vehicle or any other modules and the first module 30, 40 is thereby free to be used in a new vehicle.

Finally, the method comprises transmitting s103 a verification of the electrical disconnection to the control center 200. By the verification, the control center 200 is informed that the electrical disconnection has been correctly performed and also that the correct modules 30, 40 were electrically disconnected.

Figure 5:
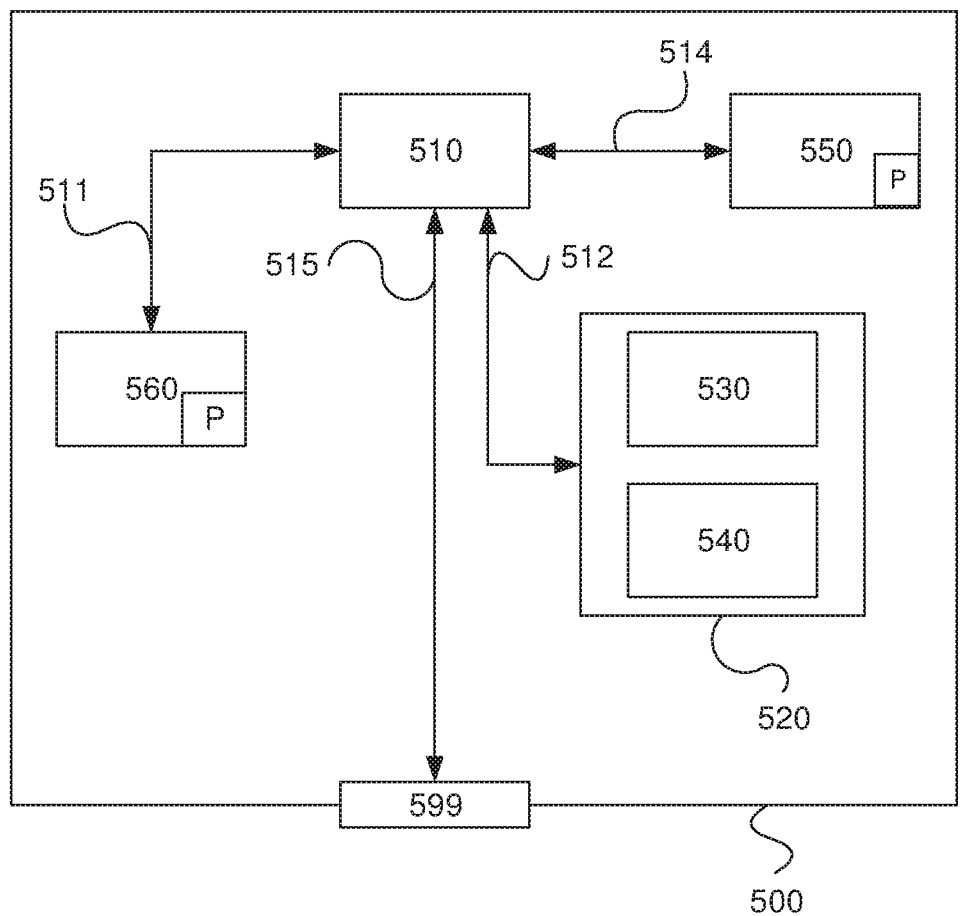
FIG. 5 schematically illustrates a control device or computer according to an embodiment.

FIG. 5 is a diagram of a version of a device 500. The control device 100 described with reference to FIG. 1 and FIG. 2 may in a version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P which comprises routines for electrically disconnecting two physically connected modules of a vehicle. The program P may be stored in an executable form or in a compressed form in a memory 560 and/or in a read/write memory 550.

Where the data processing unit 510 is described as performing a certain function, it means that the data processing unit 510 effects a certain part of the program stored in the memory 560 or a certain part of the program stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510 which runs the program stored in the memory 560 or the read/write memory 550. When the device 500 runs the program, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method, performed by a control device of a first module of a vehicle, for electrically disconnecting the first module from a second module physically connected to the first module, wherein the vehicle is assembled into an assembled vehicle from a set of modules comprising:
   at least one drive module; and
   at least one functional module,
   wherein the at least one drive module comprises a pair of wheels and is configured to be autonomously operated and to drive the assembled vehicle, and wherein the assembled vehicle is configured to communicate with a control center, the method comprising:
   identifying that the assembled vehicle is ready to be disassembled at a predetermined location for disassembly;
   based on the assembled vehicle being at the predetermined location, inactivating electrical communication, between the first module and the second module, for establishing the electrical disconnection; and
   transmitting, by the first module, a verification of the electrical disconnection to the control center while the first module is still physically connected to the second module.

2. The method according to claim 1, wherein inactivating the electrical communication comprises inactivating an internal communication network in the first module.

3. The method according to claim 1, wherein identifying that the assembled vehicle is ready to be disassembled comprises receiving instructions from the control center to disassemble the assembled vehicle.

4. The method according to claim 1, further comprising:
   receiving a command from the control center to electrically disconnect the first module form the second module.

5. The method according to claim 1, further comprising, when the first module is configured to operate as a master and the second module is configured to operate as a slave:
   commanding the second module to inactivate electrical communications in the second module.

6. The method according to claim 1, further comprising, when the first module is configured to operate as a slave:
   receiving a command from the second module that is operated as a master to inactivate electrical communication in the first module.

7. The method according to claim 1, further comprising: saving operational data of the first module.

8. The method according to claim 1, further comprising: transmitting operational data of the first module to the control center.

9. The method according to claim 1, further comprising: deleting a relationship between a unique vehicle identity of the assembled vehicle and the first module; and setting the first module in a waiting mode.

10. The method according to claim 1, wherein the identifying that the assembled vehicle is ready to be disassembled comprises:
    determining a location of the vehicle; and
    identifying that the assembled vehicle is ready to be disassembled at a predetermined location for disassembly that is based on the location of the assembled vehicle.

11. The method according to claim 1, wherein the control device is configured to:
    receive, from the control center, instructions comprising the predetermined location.

12. A non-volatile computer-readable medium comprising instructions, that when executed by a computer device, cause the computer device to:
    identify that an assembled vehicle is ready to be disassembled at a predetermined location for disassembly, wherein the assembled vehicle comprises a set of modules comprising at least one drive module and at least one functional module, wherein the at least one drive module comprises a pair of wheels and is configured to be autonomously operated and to drive the assembled vehicle, and wherein the assembled vehicle is configured to communicate with a control center;
    based on the assembled vehicle being at the predetermined location, inactivate electrical communication, between a first module and a second module physically connected to the first module, for establishing an electrical disconnection of the first module from the second module; and transmit, via the first module, a verification of the electrical disconnection to the control center while the first module is still physically connected to the second module.

13. A control device of a first module of a vehicle, the control device being configured for electrically disconnecting the first module from a second module physically connected to the first module, the vehicle being assembled into an assembled vehicle from a set of the modules comprising:
- at least one drive module; and
- at least one functional module,
- wherein the at least one drive module comprises a pair of wheels and is configured to be autonomously operated and to drive the assembled vehicle, and wherein the assembled vehicle is configured to communicate with a control center, the control device being configured to:
- identify that the assembled vehicle is ready to be disassembled at a predetermined location for disassembly;
- based on the assembled vehicle being at the predetermined location, inactivate electrical communication, between the first module and the second module, for establishing the electrical disconnection; and
- cause transmission, by the first module, of a verification of the electrical disconnection to the control center while the first module is still physically connected to the second module.

14. The control device according to claim 13, being configured to inactivate an internal communication network in the first module.

15. The control device according to claim 13, being configured to identify that the assembled vehicle is ready to be disassembled comprises receiving instructions from the control center to disassemble the assembled vehicle.

16. The control device according to claim 13, being configured to receive a command from the control center to electrically disconnect the first module from the second module.

17. The control device according to claim 13, wherein the first module is configured to operate as a master and the second module is configured to operate as a slave, wherein the control device is configured to command the second module to inactivate electrical communication in the second module.

18. The control device according to claim 13, wherein the first module is configured to operate as a slave, wherein the control device is configured to receive a command from the second module operated as a master to inactivate electrical communications in the first module.

19. The control device according to claim 13, being configured to save operational data of the first module.

20. The control device according to claim 13, being configured to transmit operational data of the first module to the control center.

21. The control device according to claim 13, being configured to delete a relationship between a unique vehicle identity of the assembled vehicle and the first module and to set the first module in a waiting mode.

22. A system, configured to electrically disconnect a first module of a vehicle from a second module physically connected to the first module, wherein the vehicle is assembled into an assembled vehicle from a set of modules comprising at least one drive module and at least one functional module, wherein the at least one drive module comprises a pair of wheels and is configured to be autonomously operated and to drive the assembled vehicle, wherein the assembled vehicle is configured to communicate with a control center, wherein the system comprises a control center arranged in communication with the vehicle, and wherein the system further comprises a control device configured to:
- identify that the assembled vehicle is ready to be disassembled at a predetermined location for disassembly; and
- based on the assembled vehicle being at the predetermined location, inactivate electrical communication, between the first module and the second module, for establishing the electrical disconnection; and
- cause transmission, by the first module, of a verification of the electrical disconnection to the control center while the first module is still physically connected to the second module.

23. A vehicle, assembled from a set of modules comprising:
- at least one drive module; and
- at least one functional module, wherein the at least one drive module comprises a pair of wheels and is configured to be autonomously operated and drive the vehicle, wherein the vehicle comprises a control device configured to:
- identify that the vehicle is ready to be disassembled at a predetermined location for disassembly; and
- based on the vehicle being at the predetermined location, inactivate electrical communication, between a first module and a second module physically connected to the first module, for establishing an electrical disconnection of the first module from the second module; and
- cause transmission, by the first module, of a verification of the electrical disconnection to a control center while the first module is still physically connected to the second module.

24. The vehicle according to claim 23, wherein the control device is configured to:
- determine a location of the vehicle based on use of one or more sensor devices or navigation systems of the vehicle; and
- determine the predetermined location for disassembly based on the location of the vehicle.

* * * * *